United States Patent
Trebouet

(10) Patent No.: US 11,685,342 B2
(45) Date of Patent: Jun. 27, 2023

(54) DEVICE FOR CLEANING A DRIVER ASSISTANCE SENSOR OF A MOTOR VEHICLE

(71) Applicant: Valeo Systèmes d'Essuyage, Le Mesnil Saint Denis (FR)

(72) Inventor: Marcel Trebouet, Le Mesnil Saint Denis (FR)

(73) Assignee: Valeo Systèmes d'Essuyage, Le Mesnil Saint Denis (FR)

(*) Notice: Subject to any disclaimer, the term of this patent is extended or adjusted under 35 U.S.C. 154(b) by 0 days.

(21) Appl. No.: 17/279,953

(22) PCT Filed: Sep. 25, 2019

(86) PCT No.: PCT/EP2019/075944
§ 371 (c)(1),
(2) Date: Mar. 25, 2021

(87) PCT Pub. No.: WO2020/064883
PCT Pub. Date: Apr. 2, 2020

(65) Prior Publication Data
US 2021/0387597 A1 Dec. 16, 2021

(30) Foreign Application Priority Data
Sep. 28, 2018 (FR) ...................................... 1858954

(51) Int. Cl.
*B60S 1/56* (2006.01)
*B08B 3/02* (2006.01)
(Continued)

(52) U.S. Cl.
CPC ................ *B60S 1/56* (2013.01); *B08B 3/024* (2013.01); *B08B 5/02* (2013.01); *B08B 13/00* (2013.01);
(Continued)

(58) Field of Classification Search
CPC ...... B60S 1/56; B60S 1/52; B60S 1/54; B08B 3/024; B08B 5/02; G02B 27/0006; G01S 7/4043; G01S 2007/4977
See application file for complete search history.

(56) References Cited

U.S. PATENT DOCUMENTS 11,142,169 B2 * 10/2021 Baudouin ................. B60S 1/56
2016/0121855 A1 * 5/2016 Doorley ................. B60S 1/566
15/250.01
(Continued)

FOREIGN PATENT DOCUMENTS

EP 3309019 A1 4/2018
WO 2018017395 A1 1/2018

OTHER PUBLICATIONS

International Search Report and Written Opinion in corresponding International Application No. PCT/EP2019/075944, dated Dec. 6, 2019 (12 pages).

*Primary Examiner* — Erin F Bergner
(74) *Attorney, Agent, or Firm* — Osha Bergman Watanabe & Burton LLP

(57) ABSTRACT

The invention relates to a device (120) for cleaning a large-optical-surface detection module (110) of a driving assistance system (100) of a motor vehicle (300), comprising at least two rails (121a, 121b, 121c) for spraying a cleaning fluid that are arranged around the large-optical-surface detection module (110), each spray rail (121a, 121b, 121c) being configured to clean a part of the optical surface of the detection module, each spray rail being able to be activated independently of the other spray rails (121a, 121b, 121c).

15 Claims, 2 Drawing Sheets

(51) Int. Cl.
    *B08B 5/02*       (2006.01)
    *B08B 13/00*     (2006.01)
    *B60S 1/52*       (2006.01)
    *B60S 1/54*       (2006.01)
    *G02B 27/00*     (2006.01)
    *G01S 7/40*       (2006.01)
    *G01S 7/497*     (2006.01)

(52) U.S. Cl.
    CPC . *B60S 1/52* (2013.01); *B60S 1/54* (2013.01); *G02B 27/0006* (2013.01); *G01S 7/4043* (2021.05); *G01S 2007/4977* (2013.01)

(56) References Cited

U.S. PATENT DOCUMENTS

| | | | |
|---|---|---|---|
| 2018/0134258 A1* | 5/2018 | Ekola | B60S 1/52 |
| 2018/0143298 A1* | 5/2018 | Newman | G01C 21/3484 |
| 2018/0265049 A1 | 9/2018 | Schmidt et al. | |
| 2018/0345916 A1* | 12/2018 | Giraud | B60S 1/0844 |
| 2020/0023815 A1* | 1/2020 | Galera | B60S 1/56 |
| 2020/0086346 A1* | 3/2020 | Kobrin | B08B 7/028 |
| 2020/0180563 A1* | 6/2020 | Gilbertson | B60S 1/485 |
| 2020/0238305 A1* | 7/2020 | Saito | B60S 1/52 |

\* cited by examiner

DEVICE FOR CLEANING A DRIVER ASSISTANCE SENSOR OF A MOTOR VEHICLE

The present invention relates to the field of driving assistance systems, and more particularly to cleaning devices intended for detection modules of such driving assistance systems.

Vehicles, in particular motor vehicles, increasingly comprise automated systems that are driving assistance systems. Such driving assistance systems comprise one or more module(s) for detecting the environment of the vehicle and external parameters of this vehicle, and at least one control unit configured to interpret the information thus gathered and to make decisions that need to be made as a result of this information.

Therefore, it will be understood that it is important to check that these detection modules are operating properly throughout the lifetime of the vehicle. In particular, these detection modules are usually arranged on the outside of the vehicle, for example carried on the body of this vehicle, and may for example get dirty, possibly making it difficult, if not impossible, for these detection modules to acquire information. Therefore, it is necessary to provide a cleaning system capable of effectively removing the detritus, dirt, organic elements and other interfering elements that may be deposited and hamper the acquisition of images by these detection modules. A known solution is to spray a quantity of washer fluid onto an optical surface of the detection module in question and then to dry this surface, but it should be noted that such a solution can be costly in terms of washer fluid, or water, if large amounts are sprayed without a particular strategy, even more so in the case of self-driving vehicles, in which numerous detection modules are employed around the perimeter of the vehicle.

Furthermore, it should be noted that the spraying of washer fluid makes the detection module inoperative, or at least has a negative effect on the optical function of this detection module during cleaning. However, in the case of a self-driving vehicle, the steering of the vehicle is based on the information detected, this requiring high quality of the detected images. The detection modules are thus disposed in a redundant manner, meaning that when one detection module is inoperative or is operating in a downgraded mode, another module can ensure the detection of a corresponding image.

The present invention falls within this context and aims to provide a device for cleaning a large-optical-surface detection module of a driving assistance system of a motor vehicle, comprising at least two rails for spraying a cleaning fluid that are arranged around the large-optical-surface detection module, each spray rail being configured to clean a part of the optical surface of the detection module, each spray rail being able to be activated independently of the other spray rails.

A "large-optical-surface detection module" is understood to be a module configured to acquire images of an environment surrounding it, with an opening of the field of view of at least 180°. For example, this detection module may consist of a light beam transceiver, the detection module taking the form of a LIDAR (acronym for "Light Detection And Ranging") module that is able to collect information all around it in order to construct a 360° image. Such a detection module may comprise one or more long-range sensor(s) configured to reconstruct images following wave emission/reception.

The expression "able to be activated separately" means that all of the steps for the spraying of cleaning fluid by the spray rail in question can be carried out by a spray rail for cleaning a part of the optical surface without a cleaning operation via another spray rail being triggered. Advantageously, the independence of these spray rails allows the entire optical surface of the detection module never to be cleaned at the same time. As mentioned above, during cleaning, the acquisition of images by the detection module is hampered, or even prevented entirely. Cleaning the entire detection module in a single step would thus blind the vehicle equipped with such a detection module, this possibly proving dangerous for the safety of the occupants of the vehicles and also of other road users when driving. The present invention thus makes it possible to maintain the function of, at least partial, image acquisition by the detection module, while ensuring cleaning since, when dirt, organic waste or other detritus is deposited on the detection module, the acquisition of images can also be disrupted, if not prevented.

According to one feature of the present invention, the cleaning device may have an annular shape, with each spray rail having the shape of a portion of a ring. It will be understood that this annular shape is particularly advantageous when the detection module associated with the spray rails has an optical surface forming a cylinder of revolution or a portion of a cylinder.

According to the invention, each spray rail comprises at least two fluid spray nozzles. The number and disposition of the nozzles along the rail makes it possible to control the spray of fluid—liquid or pulsed air—onto the surface to be cleaned.

According to one feature of the present invention, each spray rail is mounted on a telescopic deployment device, so as to be able to take up at least one retracted first position and at least one deployed second position. The deployed second position corresponds to a position in which the spray nozzles are released from the body of the vehicle and face the optical surface of the detection module, thereby allowing the spraying of fluid, and the retracted position, for its part, is a rest position that allows the acquisition of images by the detection module without the rail being in the field of view of the detection module.

According to one feature of the present invention, the movement of each spray rail from the retracted first position to the deployed second position is controlled by a deployment device inherent thereto. For example, at least one deployment device is a hydraulic deployment device. Advantageously, all the deployment devices are hydraulic deployment devices. It will be understood that the use of a hydraulic deployment device may not only make it possible to spray the liquid for cleaning the detection module but may also make it possible to deploy the spray rails, if necessary with the same fluid, namely the cleaning fluid. Alternatively, at least one deployment device, advantageously all the deployment devices, is/are (a) pneumatic deployment device(s).

The invention also relates to a driving assistance system comprising at least one large-optical-surface detection module configured to acquire images in an angular field of at least 180°, in particular 360°, and at least one cleaning device according to the invention, the cleaning device being intended to clean the detection module with each spray rail of the cleaning device being intended to clean an angular sector of the detection module. According to one exemplary embodiment of the present invention, all the angular sectors cleaned by a spray rail of the cleaning device are identical.

In other words, if the large-optical-surface detection module is a module that is able to detect a 360° image and the cleaning device comprises three spray rails, each spray rail cleans an angular sector of 120°.

According to one feature of the present invention, at least one angular sector of the detection module is intended to acquire images relating to a road scene in front of the vehicle for which the driving assistance system is intended, this angular sector being centered on a longitudinal axis of forward movement of the vehicle. The term "front of the vehicle" should be understood here with respect to a direction of movement of the vehicle along the longitudinal axis of forward movement.

According to one exemplary embodiment of the present invention, the detection module comprises at least one detection member using wave emission. A "detection member using wave emission" is understood to be a member configured to determine a distance separating it from any object by emitting at least one wave and measuring the time it takes for this wave to return. In other words, the distance is calculated by measuring the time between the emission of the wave and the detection of a reflection of this wave by the object in question. Thus, on the basis of the time measured and the theoretical speed of propagation of the wave, the detection member is configured to determine the distance separating it from the object from which the wave has been reflected. The waves may be, for example, light waves or electromagnetic waves. In the description, the terms "detection member" and "detection member using wave emission" are used indiscriminately.

The present invention also relates to a motor vehicle comprising at least one driving assistance system according to the invention.

Lastly, the present invention relates to a method for cleaning a driving assistance system according to the invention, comprising at least one step in which a control unit receives an item of information relating to a demand for cleaning at least one angular sector of the detection module, at least one step in which the control unit sends a request to check that the other angular sectors of the detection module are operational, at least one step in which the control unit sends a first instruction for moving the spray rail intended for cleaning the angular sector in question from its retracted position to its deployed position, at least one step in which the control unit sends a second instruction causing a fluid to be sprayed by the spray rail in question, and at least one step in which the control unit sends a third instruction for moving the spray rail in question from its deployed position to its retracted position.

It will also be understood that cleaning fluid is sprayed by the spray nozzles incorporated in each spray rail. According to the invention, the spray of fluid may also be started as soon as the spray rail in question is deployed, that is to say while it moves from its retracted first position to its deployed second position.

With reference to the above, when the deployment devices are hydraulic deployment devices and their deployment is effected by virtue of an injection of cleaning fluid, it will be understood that the first instruction and the second instruction sent by the control unit are combined.

Further details, features and advantages will become more clearly apparent upon reading the detailed description given below by way of indication and with reference to the various exemplary embodiments illustrated in the following figures:

FIG. 1 schematically illustrates a top view of a motor vehicle equipped with a driving assistance system according to the invention, this driving assistance system comprising at least one detection module and a cleaning device according to one aspect of the invention that is associated with this detection module;

In the rest of the description, the terms "longitudinal", "transverse" and "vertical" are with reference to an orientation of a driving assistance system 100 according to the invention when the latter is incorporated in a motor vehicle 300. Thus, the term "longitudinal" corresponds to a direction parallel to a main axis of forward movement of the vehicle and to a longitudinal axis L of a trihedron L, V, T shown in the figures, the term "transverse" corresponds to a direction parallel to a transverse axis T of this trihedron, the transverse axis being perpendicular to the longitudinal axis L, and the term "vertical" corresponds to a direction parallel to a vertical axis V of the trihedron, this vertical axis V being perpendicular to the longitudinal axis L and to the transverse axis T. The terms "lower", "upper", "top" and "bottom" refer to relative positions along the vertical axis V, a lower or bottom part of the vehicle being for example the wheels of the latter and an upper or top part of this vehicle being formed for example by the roof of this vehicle.

Figure 1:
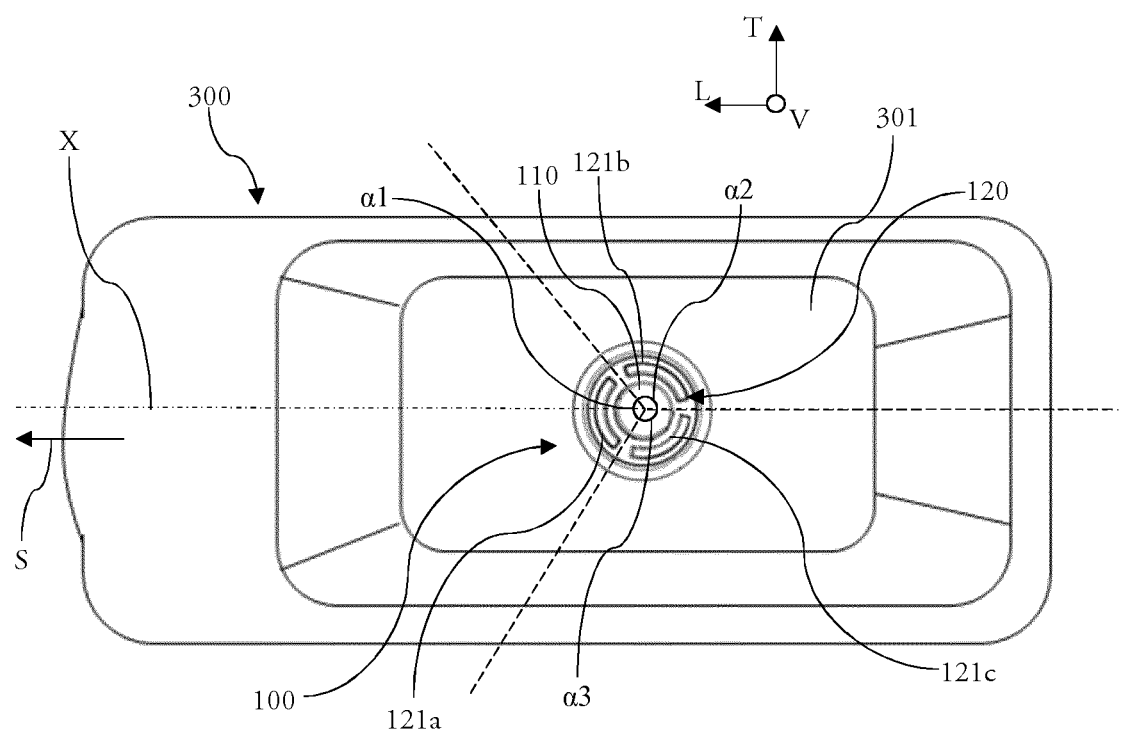

FIG. 1 is a top view of a motor vehicle 300 comprising at least one driving assistance system 100 according to the invention. More particularly, according to the example illustrated here, the driving assistance system 100 is positioned on a roof 301 of the motor vehicle 300. As will be described more fully below, this driving assistance system 100 comprises at least one detection module 110 configured to acquire at least 180° images, in this case 360° images, of an environment of the vehicle 300. In other words, this detection module 110 is configured to acquire images of the entire environment of the vehicle 300.

The positioning of this detection module 110 on the outside of the vehicle 300 exposes it to dirt, organic matter or any other detritus. Thus, in order to allow this detection module 110 to function optimally, it is necessary to regularly clean its optical surface directly in contact with this dirt and other detritus. To this end, the driving assistance system 100 according to the invention also comprises a device 120 for cleaning this detection module 110. According to an example illustrated in the figures, the cleaning device 120 comprises three spray rails 121*a*, 121*b*, 121*c*, each intended to clean an angular sector α1, α2, α3 of the optical surface of the detection module 110. Thus, a first spray rail 121*a* is intended to clean a first angular sector α1, a second spray rail 121*b* is intended to clean a second angular sector α2 and a third spray rail 121*c* is intended to clean a third angular sector α3.

As will be described in detail below, the cleaning of an angular sector of the detection module 110 disrupts, or even completely prevents, the acquisition of images by this specific angular sector. Thus, the present invention is designed to allow selective cleaning, angular sector by angular sector, of this detection module 110, such that the, at least partial, acquisition of images can be effected permanently by the detection module. The present invention thus makes it possible to avoid totally blinding the detection module 110, which could be dangerous for the safety of the occupants of the vehicle 300 equipped with the driving assistance system 100 according to the invention, but also for other users sharing the road with this vehicle 300.

As shown in FIG. 1, each angular sector α1, α2, α3 of the detection module 110 is identical to the other two. In other words, according to the illustrated example of a detection module, the optical surface of which allows 360° image capturing, each angular sector α1, α2, α3 has a 120° opening. According to this example, the first angular sector α1 is intended to acquire images of a road scene in front of the vehicle 300, the second angular sector α2 and the third angular sector α3 being for their part intended to acquire images of road scenes situated to the side of and behind the vehicle, each of these second and third angular sectors α2, α3 being intended for a defined side of the vehicle 300. As illustrated, the first angular sector α1 is centered on an axis X of forward movement of the vehicle 300.

The terms "front" and "rear" of the vehicle 300 are understood here with reference to a main direction of movement S of the vehicle along the axis X of forward movement of this vehicle 300.

Alternatively, it may be possible for example to provide for the detection module to be divided into more than three angular sectors, for example into four angular sectors each of 90°, in which case the cleaning device will comprise four spray rails, each of which is intended to clean one of these angular sectors.

Figure 2:
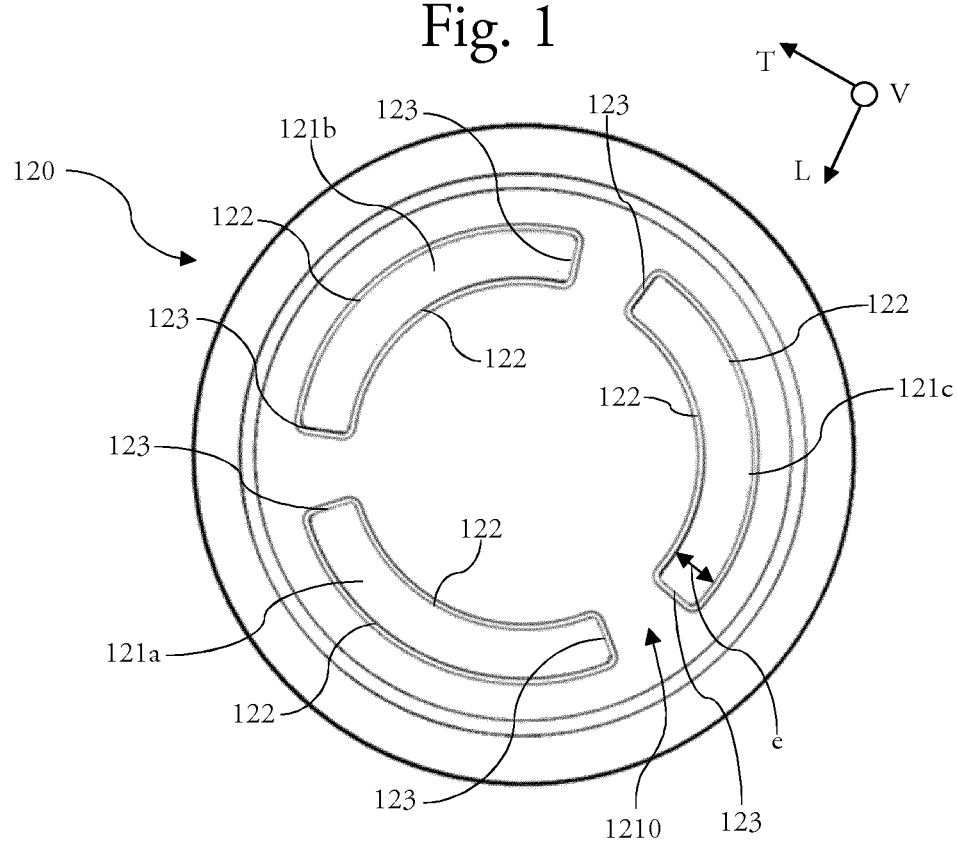
FIG. 2 is a top view of the cleaning device of the driving assistance system illustrated in FIG. 1.
Figure 3:
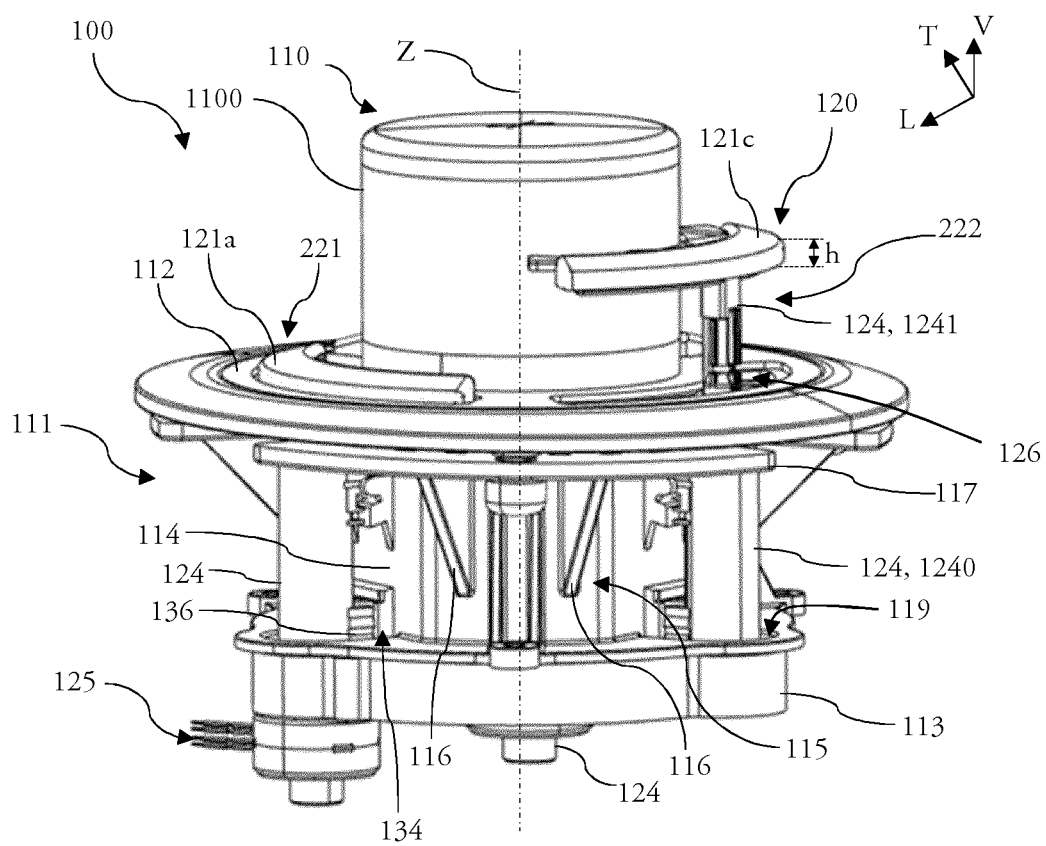
FIG. 3 illustrates a perspective view of the driving assistance system according to the invention in a situation in which the cleaning device of the detection module is employed, FIG. 3 revealing means for actuating spray rails of the cleaning device.

With reference to FIGS. 2 and 3, the driving assistance system 100 according to the invention will now be described in more detail, FIG. 2 being a top view of the cleaning device 120 of this driving assistance system 100 and FIG. 3 being a perspective view of the driving assistance system 100 as a whole, i.e. of the detection module 110 and of the cleaning device 120 associated with this detection module 110.

As is particularly apparent from FIG. 2, the cleaning device 120 according to the invention has an annular overall shape with the spray rails that form this spray device each having the shape of a portion of a ring. In other words, each spray rail 121a, 121b, 121c is delimited by two edges 122 in the form of circular arcs connected together by two straight edges 123 and has a thickness e greater than a height h—illustrated for example in FIG. 3—of this same spray rail 121. As shown, the thickness e of each spray rail 121a, 121b, 121c is measured radially between the two edges 122 in the form of circular arcs and parallel to one of the straight edges 123 of the spray rail 121a, 121b, 121c in question, and the height h of each of these spray rails 121a, 121b, 121c is measured parallel to the vertical axis V of the illustrated trihedron, that is to say parallel to the direction of telescopic movement of the spray rail 121a, 121b, 121c.

Each of these spray rails 121a, 121b, 121c comprises at least two spray nozzles—not illustrated here—that are configured to spray the cleaning fluid intended to wash the angular sector for which the spray rail 121a, 121b, 121c in question is intended. As shown, each spray rail 121a, 121b, 121c extends only over a portion of the angular sector for which it is intended. However, the spray nozzles of each of these spray rails 121a, 121b, 121c are arranged so as to cover the entire angular sector for which the spray rail in question is intended, that is to say such that cleaning fluid is sprayed onto the entire angular sector in question. The expression "spraying cleaning fluid onto the entire angular sector" is understood to mean a spray of cleaning fluid onto the optical surface of the detection module, said optical surface being configured to allow the acquisition of images in the angular sector in question. It will be understood that this arrangement of the nozzles thus makes it possible to cover all of the angular sectors while leaving a space 1210 between the spray rails 121a, 121b, 121c so as to allow the respective deployment thereof without hindrance.

As described above, each spray rail 121a, 121b, 121c of the cleaning device 120 is intended to clean an angular sector of the detection module 110. In order to allow the detection module 110 to acquire images of its environment outside cleaning phases without the spray rails being in the field of view of the detection module, the spray rails 121a, 121b, 121c are movable between a retracted first position, in which the acquisition of images is possible, and a deployed second position, in which cleaning can be effected. These two positions are illustrated for example in FIG. 3 and described more fully below.

FIG. 3 illustrates a perspective view of the detection module 110 and the cleaning device 120 intended to clean this detection module 110. According to the invention, the detection module 110 is in this case in the form of a straight cylinder with an axis of revolution Z parallel to the vertical axis V of the trihedron, and it comprises an optical surface 1110 surrounding a detection member using wave emission, that is to say a detection member configured to evaluate a distance separating it from any object by measuring a time between an instant t at which it outputs a wave and an instant t1 at which this wave is reflected. Thus, this detection member comprises at least one emitting member configured to emit at least one wave and at least one receiving member configured to receive the reflected wave, neither the emitting member nor the receiving member being visible in the figures. According to various exemplary embodiments of the present invention, the detection member may be a RADAR system (acronym for "RAdio Detection And Ranging") that is able to transmit and receive electromagnetic waves, or be a LIDAR system (acronym for "LIght Detection And Ranging") that is able to transmit and receive light waves, for example a laser beam. According to the example illustrated in the figures, the detection module 110 is a LIDAR system and the optical surface 1100 of the detection module 110 is configured to allow the transmission of light waves the acquisition of images that is mentioned above is formed by a lens that is able to shape the light waves.

According to an example that is not illustrated here, the detection module may comprise a plurality of detection members, which may or may not be identical.

FIG. 3 also illustrates the first spray rail 121a in its retracted first position 221, that is to say a position in which this first spray rail 121a is situated outside a path taken by the waves emitted by the detection module 110, and the third spray rail 121c in its deployed second position 222, that is to say a position in which this third spray rail 121c is able to spray cleaning fluid onto the optical surface 1110 in order to clean the angular sector in question.

It is clearly apparent from this FIG. 3 that, when a spray rail 121c is in its deployed second position 222, it is arranged across the path taken by the waves emitted by the detection module 110, such that the detection module 110 can no longer acquire full data about its environment. As will be described in detail below, each spray rail 121a, 121b, 121c is controlled independently of the other two, such that only one spray rail can take up a deployed position, as illustrated in FIG. 3. This ensures that the detection module 110 can continue to acquire images over at least one angular sector, advantageously two angular sectors, even during cleaning. In other words, the driving assistance system 100 according to the invention allows continuous acquisition of images, this driving assistance system 100 thus being particularly suitable for incorporation in a self-driving or partially self-driving vehicle.

In order to pass from their retracted first position 221 to their deployed second position 222, the spray rails 121a, 121b, 121c are telescopic, meaning that they each comprise a deployment device 124 configured to lengthen or contract along a vertical straight rail parallel to the vertical main extension direction Z of the detection module 110. In the rest of the description, the phenomenon of lengthening of the deployment device 124, implemented when the spray device is intended to be moved toward the deployed position, will be known as "deployment of the deployment device" and the phenomenon of contraction of this deployment device, implemented when the spray device is intended to be moved toward the retracted position, will be known as "contraction of the deployment device".

Each deployment device 124 has a guide tube 1240 for a piston 1241 that is able to move in translation inside the tube, the spray rail 121a, 121b, 121c associated with each deployment device being mounted at the end of the piston.

The deployment devices 124 can, for example, be hydraulic deployment devices, meaning devices configured such that the piston and the associated rail are deployed under the effect of a hydraulic pressure. Thus, each of these deployment devices 124 comprises at least one liquid inlet 125, this liquid inlet 125 comprising at least one controllable shut-off means, not shown in the figures. According to the invention, the controllable shut-off means of each of the liquid inlets 125 are controllable independently of one another. In other words, the deployment of each deployment device 124 is controlled independently of the deployment of the other deployment devices 124. Thus, each spray rail 121a, 121b, 121c can pass from its retracted first position 221 to its deployed second position 222 independently of the others. In other words, the present invention allows targeted and individualized cleaning of each angular sector of the detection module 110.

Advantageously, the liquid allowing the deployment of the piston of the deployment device 124, and consequently of the spray rail 121a, 121b, 121c in question, can be the cleaning fluid, for example a washer fluid. As a result, when cleaning of one of the angular sectors is demanded, the shut-off means is opened so as to allow the inlet of the cleaning fluid into the deployment device 124. While the fluid enters the deployment device 124, the piston of the latter moves inside the tube in the direction of deployment of the device. As soon as the fluid arrives at the spray nozzles carried by the spray rails 121a, 121b, 121c, the cleaning of the angular sector in question starts. Depending on the arrangement of the liquid flow ducts within the deployment device, it will be understood that the cleaning of this angular sector can start before the spray rail 121 reaches its highest position, such that the detection module 110, and more particularly the angular sector of this detection module, is cleaned over its entire height, that is to say over its entire vertical dimension.

Alternatively, these deployment devices 124 may be pneumatic deployment devices, in which case the above-described liquid inlet is replaced by a compressed air inlet.

As can be seen in FIG. 3, the detection module 110 is carried by a support 111, which comprises at least an upper wall 112 and a lower wall 113 that are connected together by a trunk 114. As mentioned above, the spray rails 121a, 121b, 121c are movable along vertical axes and openings 126 are made in the upper wall 112 of the support 111, these openings 126 being configured to receive the spray rails in their retracted positions and for the passage of the deployment devices 124 of the spray rails 121a, 121b, 121c. Advantageously, these openings 126 have dimensions identical, or substantially identical, to the dimensions of the spray rails 121a, 121b, 121c such that these openings 126 are closed by the spray rails 121a, 121b, 121c when the latter are in their retracted first position 221. One of these openings 126 can thus be seen in FIG. 3. It will be understood that, according to the invention, as many openings 126 are made in the upper wall 112 as the driving assistance system 100 comprises spray rails 121a, 121b, 121c.

Orifices 119 are also made in the lower wall 113 so as to allow the tubes 1240 of the deployment devices 124 to be held. Again, it will be understood that the support 111 comprises as many orifices 119 as the cleaning device has spray rails 121a, 121b, 121c.

It will also be noted that the support 111 has first reinforcements 115 arranged between the deployment devices 124. These first reinforcements 115 comprise, according to the example illustrated here, at least two brackets 116 that are fastened to the trunk 114 of the support and carry a perforated plate 117 for the tubes of the deployment devices 124 to pass through.

Each deployment device 124 is secured to the trunk 114 of the support 111 by virtue of a fastening means 134 inherent thereto. According to the example illustrated here, the fastening means 134 comprise at least two tabs 136—only one of these tabs 136 being visible for each fastening means 134 illustrated here—that are configured to grip the deployment device 124 in question. Alternatively, provision could be made for example for the deployment devices 124 to be adhesively bonded or screwed to the trunk 114 of the support 111. It will be understood that these are only exemplary embodiments and that any other fastening means is conceivable without departing from the context of the invention as long as it allows the deployment device to be held on the support and also the deployment and contraction of a piston of this deployment device.

Figure 4:
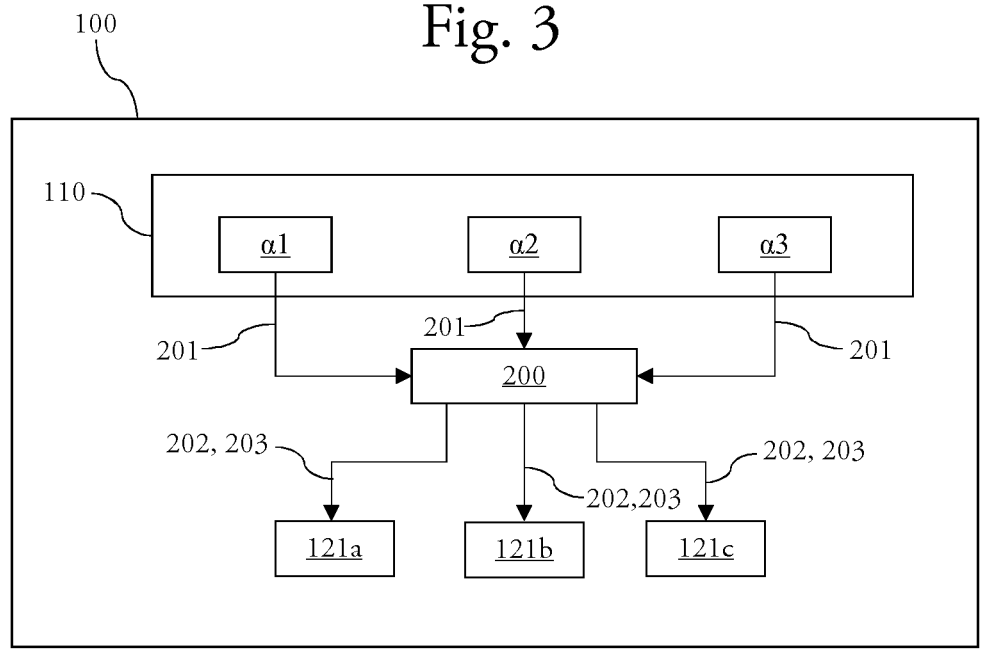
FIG. 4 shows, in the form of a block diagram, a cleaning method implemented by the driving assistance system according to the invention.

Finally, FIG. 4 illustrates, in the form of a block diagram, a method for cleaning a driving assistance system 100 according to the invention. This method thus comprises at least one step in which a control unit 200 receives an item of information 201 relating to the presence of a disruptive element on an angular sector $\alpha 1$, $\alpha 2$, $\alpha 3$ of the detection module 110. A "disruptive element" is understood here to be an element that hampers, or even prevents, the acquisition of information by one or another of the angular sectors of the detection module 110. Thus, this disruptive element may be for example dirt, organic matter, or any other detritus that could be deposited on this detection module 110 and hamper or prevent the acquisition of images.

The control unit sends a request to the detection module in order to determine if each of the angular sectors of the detection module is operational. If several items of information from different angular sectors are sent simultaneously to the control unit, meaning that several angular sectors of the optical surface of the detection module are dirty and require a cleaning operation, an order of priority is predetermined such that at least one, advantageously at least two, of the angular sectors of the detection module are not cleaned immediately after an item of information indicating the presence of a disruptive element has been received by the control unit, but in a staggered manner with respect to the first angular sector cleaned, so as to remain capable of acquiring images, even in downgraded operation. According to one application example of the invention, the cleaning of the angular sector intended for the acquisition of images of the road scene in front of the vehicle takes priority with respect to the cleaning of the other two angular sectors. The control unit can thus give the instruction for this angular sector intended to acquire images of the road scene in front of the vehicle to be cleaned only when the vehicle is at a standstill (at traffic lights for example) or when the vehicle is running below a given speed.

This possibility of controlling which part of the large-optical-surface detection module is cleaned is made possible by the fact that each spray rail is able to be activated independently of the other spray rails. The control unit 200 is thus programmed to send a first instruction 202 specifically to the spray rail 121*a*, 121*b*, 121*c* intended for cleaning the angular sector α1, α2, α3 that has sent the information 201 indicating the presence of a disruptive element. This first instruction 202 allows the deployment of the spray rail 121*a*, 121*b*, 121*c* in question, meaning that this first instruction 202 more particularly causes the opening of the shut-off means so as to allow the inlet of liquid or compressed air such that the associated deployment device can deploy and thus move the spray rail 121*a*, 121*b*, 121*c* next to the surface to be cleaned. When the deployment devices are deployed by virtue of the cleaning fluid, this first instruction 202 makes it possible to bring about both the deployment of the spray rail 121*a*, 121*b*, 121*c* in question and the spraying of the cleaning fluid through the spray nozzles of this spray rail 121*a*, 121*b*, 121*c*. On the other hand, if this liquid is not cleaning fluid or if the deployment devices are pneumatic devices, the control unit 200 is also configured to send a second instruction 203 allowing the spraying of cleaning fluid. For example, the first instruction 202 and the second instruction 203 can be sent simultaneously.

Once the angular sector α1, α2, α3 in question has been cleaned, the control unit 200 sends a third instruction causing the contraction of the deployment device of the spray rail in question. In other words, the first instruction makes it possible to move the spray rail in question from its retracted position to its deployed position and the third instruction, for its part, makes it possible to move this spray rail from its deployed position to its retracted position.

The present invention thus proposes a simple and inexpensive means for the sequential cleaning of a detection module of a driving assistance system intended for a vehicle, for example a self-driving or partially self-driving vehicle. Advantageously, such sequential cleaning makes it possible in particular to permanently maintain a function of image acquisition by the detection module, at least in a partial form.

The present invention is not limited to the means and configurations described and illustrated herein, however, but also extends to all equivalent means or configurations and to any technically functional combination of such means. In particular, the shape, the number and the disposition of the spray rails and of their associated deployment devices may be modified without having a negative effect on the invention, provided that they provide the functionalities described and illustrated in the present document.

The invention claimed is:

1. A method for cleaning a driving assistance system for a motor vehicle, comprising:
receiving an item of information relating to a demand for cleaning of a first angular sector of a detection module, wherein the detection module comprises one sensor unit with a plurality of angular sectors arranged around an exterior of the detection module, and
wherein the detection module is configured to acquire images within a given field of view;
checking that one or more other angular sectors of the plurality of angular sectors are operational;
sending a first instruction, a second instruction, and a third instruction to a cleaning device configured to clean an optical surface of the detection module,
wherein the cleaning device comprises at least two spray rails for spraying a cleaning fluid, the at least two spray rails being arranged around the detection module, each spray rail being configured to clean one angular sector of the plurality of angular sectors, and each spray rail configured to be activated independently of the other spray rails;
moving a first spray rail of the at least two spray rails from a retracted position to a deployed position based, at least in part, on the first instruction;
spraying a volume of cleaning fluid from the first spray rail based, at least in part, on the second instruction;
cleaning the first angular sector of the plurality of angular sectors; and
moving the first spray rail from the deployed position to the retracted position based, at least in part, on the third instruction.

2. The method as claimed in claim 1, wherein the cleaning device comprises a substantial annular shape.

3. The method as claimed in claim 1, wherein each spray rail comprises at least two fluid spray nozzles.

4. The method as claimed in claim 1, wherein each spray rail is mounted on a telescopic deployment device, and wherein moving the first spray rail comprises actuating the telescopic deployment device to retract the first spray rail to at least one deployed position.

5. The method as claimed in claim 4, comprising hydraulically operating the telescopic deployment device.

6. The method as claimed in claim 1, wherein each spray rail is mounted on a telescopic deployment device, and wherein moving the first spray rail comprises actuating the telescopic deployment device to retract the first spray rail to at least one retracted position.

7. The method as claimed in claim 6, comprising hydraulically operating the telescopic deployment device.

8. The method as claimed in claim 1, wherein receiving the item of information comprises acquiring images relating to a road scene in front of the motor vehicle for which the driving assistance system is intended, a front angular sector of the plurality of angular sectors being centered on a longitudinal axis of forward movement of the motor vehicle.

9. The method as claimed in claim 1, wherein the detection module comprises a cylindrical sensor unit having three angular sectors arranged circumferentially around a center of the cylindrical sensor unit, wherein the three angular sectors in combination allow 360° image capturing and wherein each angular sectors comprises a 120° opening.

10. The method as claimed in claim 9, wherein a first of the three angular sectors is configured to acquire a first set of images of a road scene in front of the motor vehicle, wherein a second of the three angular sectors is configured to acquire a second set of images of one or more road scenes situated to a first side and a rear of the motor vehicle, wherein a third of three angular sectors is configured to acquire a third set of images of one or more road scenes situated to a second side and the rear of the motor vehicle, and wherein the first side and the second side are opposite one another.

11. The method as claimed in claim 9, wherein the cleaning device comprises three spray rails, each spray rail configured to clean one of the three angular sectors, wherein each spray rail is separated from adjacent spray rails by a space to allow deployment of each spray rail without hindrance.

12. The method as claimed in claim 11, wherein only one of the three spray rails is moved to the deployed position at a given time.

13. The method as claimed in claim 1, further comprising acquiring one or more images over the one or more other angular sectors during cleaning of the first angular sector.

14. The method as claimed in claim 1, wherein the at least two spray rails are telescopic and are configured to lengthen or contract along a vertical straight rail parallel to a vertical main extension direction of the detection module, wherein the retracted position is characterized by a contraction of the at least two spray rails, and wherein the deployed position is characterized by a lengthening of the at least two spray rails.

15. The method as claimed in claimed in claim 4, comprising pneumatically operating the telescopic deployment device.

\* \* \* \* \*